US011420226B2

(12) United States Patent
Tsuda et al.

(10) Patent No.: US 11,420,226 B2
(45) Date of Patent: *Aug. 23, 2022

(54) METHOD FOR FORMING MULTILAYER COATING FILM

(71) Applicant: KANSAI PAINT CO., LTD., Hyogo (JP)

(72) Inventors: Hirohisa Tsuda, Hyogo (JP); Toshiki Takenaka, Hyogo (JP); Michihiro Fujita, Hyogo (JP); Hideaki Katsuta, Hyogo (JP)

(73) Assignee: KANSAI PAINT CO., LTD., Hyogo (JP)

( * ) Notice: Subject to any disclaimer, the term of this patent is extended or adjusted under 35 U.S.C. 154(b) by 904 days.

This patent is subject to a terminal disclaimer.

(21) Appl. No.: 16/314,917

(22) PCT Filed: Apr. 11, 2017

(86) PCT No.: PCT/JP2017/014835
§ 371 (c)(1),
(2) Date: Jan. 3, 2019

(87) PCT Pub. No.: WO2018/008221
PCT Pub. Date: Jan. 11, 2018

(65) Prior Publication Data
US 2019/0168255 A1    Jun. 6, 2019

(30) Foreign Application Priority Data

Jul. 8, 2016 (JP) .............................. JP2016-136018
Jan. 12, 2017 (JP) .............................. JP2017-003456

(51) Int. Cl.
| B05D 1/36 | (2006.01) |
| B05D 7/00 | (2006.01) |
| B05D 1/02 | (2006.01) |
| C09D 5/00 | (2006.01) |
| E02F 9/00 | (2006.01) |
| C09D 133/00 | (2006.01) |
| C09D 163/00 | (2006.01) |
| C09D 133/04 | (2006.01) |
| C09D 175/16 | (2006.01) |
| C08G 18/62 | (2006.01) |
| C08G 18/48 | (2006.01) |
| C08G 18/79 | (2006.01) |
| C09D 5/08 | (2006.01) |

(52) U.S. Cl.
CPC .............. *B05D 1/36* (2013.01); *B05D 7/542* (2013.01); *C08G 18/4825* (2013.01); *C08G 18/6229* (2013.01); *C08G 18/792* (2013.01); *C09D 5/00* (2013.01); *C09D 133/00* (2013.01); *C09D 133/04* (2013.01); *C09D 163/00* (2013.01); *C09D 175/16* (2013.01); *E02F 9/00* (2013.01); *B05D 1/02* (2013.01); *B05D 2202/00* (2013.01); *B05D 2503/00* (2013.01); *B05D 2504/00* (2013.01); *B05D 2601/02* (2013.01); *C09D 5/084* (2013.01)

(58) Field of Classification Search
None
See application file for complete search history.

(56) References Cited

U.S. PATENT DOCUMENTS

2014/0030528 A1* 1/2014 Kitagawa ............. C08G 18/792
428/407
2015/0232693 A1    8/2015 Ishikura

FOREIGN PATENT DOCUMENTS

| JP | 2002-273322 | 9/2002 |
| JP | 2008-543532 | 12/2008 |
| JP | 2014-151257 | 8/2014 |
| JP | 2016-130302 | 7/2016 |
| WO | 2006/132437 | 12/2006 |
| WO | 2013/024784 | 2/2013 |
| WO | 2014/054593 | 4/2014 |

OTHER PUBLICATIONS

JP5221822B1 Translation Google Patents (Year: 2013).*
International Search Report dated May 9, 2017 in International (PCT) Application No. PCT/JP2017/014835.

* cited by examiner

*Primary Examiner* — Francisco W Tschen
(74) *Attorney, Agent, or Firm* — Wenderoth, Lind & Ponack, L.L.P.

(57) ABSTRACT

An object achieved by the present invention is to provide a coated article having excellent appearance, corrosion resistance, weatherability, and chipping resistance obtained by a wet-on-wet coating. The present invention provides a method for forming a multilayer coating film comprising the steps of forming, on a substrate, an uncured coating film of a primer paint composition (A) containing an epoxy resin (a1) having a weight average molecular weight of 20000 or more and pigments, forming, on the uncured coating film, a top coating film of a top paint composition (B) containing an acrylic resin (b1) and the like, and simultaneously drying the films, wherein the uncured coating film of the primer paint composition (A) during application of the top paint composition (B) has a viscosity of 5 Pa·s to 1000 Pa·s, and the value ΔNV obtained by subtracting the value (NV1) of application mass solids content (%) of the primer paint composition (A) from the value (NV2) of mass solids content (%) of the uncured coating film of the primer paint composition (A) during the application of the top paint composition is 15 or more.

16 Claims, No Drawings

METHOD FOR FORMING MULTILAYER COATING FILM

TECHNICAL FIELD

The present invention relates to a method comprising forming an uncured coating film of a primer paint composition on a substrate, and applying a top paint composition on the uncured coating film by a wet-on-wet process; and a coated article having excellent appearance, corrosion resistance, weatherability, and chipping resistance obtained by the above method.

BACKGROUND ART

A coating method called a wet-on-wet process is known. In this method, a primer paint composition is applied to a substrate, after which a top paint composition is applied thereto without drying the primer paint composition, and then the two coating films are simultaneously dried; thus, this method can reduce steps.

A wet-on-wet coating method has recently been used to reduce steps for coating industrial machinery or construction machinery, such as bulldozers, hydraulic excavators, and wheel loaders. However, the wet-on-wet coating method used for industrial machinery or construction machinery has the problems disclosed in Items 1 to 3 below.

1. In drying a coating film, heat in a drying furnace is not sufficiently transferred due to large heat capacity of a substrate; thus, the curability of the coating film is not sufficient. Accordingly, it has been difficult to obtain a coated article having excellent appearance and corrosion resistance by a wet-on-wet coating method including fewer drying steps.

2. Since construction machinery or industrial machinery has many perpendicular portions, uncured coating films may sag due to wet-on-wet coating, and the appearance will be unstable in some portions.

3. Since construction machinery or industrial machinery is used outside, coating film curability, corrosion resistance, weatherability, etc., are required.

Patent Literature 1 discloses a coating method using a wet-on-wet process, wherein an undercoating paint composition comprises an acrylic resin, epoxy resin, isocyanate compound, and surface adjusting agent; a top paint composition comprises an acrylic resin, isocyanate compound, and surface adjusting agent; and the value $\Delta\gamma$ ($\gamma1-\gamma2$) obtained by subtracting the value ($\gamma2$) of the surface tension of the top paint composition from the value ($\gamma1$) of the surface tension of the undercoating paint composition is 2 to 8 mN/m.

Patent Literature 2 discloses, in addition to the conditions disclosed in PTL 1, a method for forming a coating film in which an undercoating film and a top coating film have a lamellar length of 4 mm or less.

However, the coated articles obtained by the methods for forming a coating film disclosed in PTL 1 and 2 have poor appearance, corrosion resistance, weatherability, or chipping resistance; accordingly, improvement has been desired.

CITATION LIST

Patent Literature

PTL 1: WO2013/24784
PTL 2: JP2014-151257A

SUMMARY OF INVENTION

Technical Problem

An object of the present invention is to provide a coated article having excellent appearance, corrosion resistance, weatherability, and chipping resistance by a method for forming a multilayer coating film comprising forming an uncured coating film of a primer paint composition on a substrate, forming a top paint coating film on the uncured coating film, and simultaneously drying the films.

Solution to Problem

As a result of extensive research, the present inventors found that the above problems can be solved, and thus accomplished the present invention.

Specifically, the present invention relates to the following;

1. A method for forming a multilayer coating film comprising forming an uncured coating film of a primer paint composition (A) as defined below on a substrate, forming a top coating film of a top paint composition (B) as defined below on the uncured coating film, and simultaneously drying the films, wherein the uncured coating film of the primer paint composition (A) during application of the top paint composition (B) has a viscosity of 5 Pa·s to 1000 Pa·s, and a value $\Delta NV$ obtained by subtracting a value (NV1) of application mass solids content (%) of the primer paint composition (A) from a value (NV2) of mass solids content (%) of the uncured coating film of the primer paint composition (A) during application of the top paint composition (B) is 15 or more.

Primer Paint Composition (A):

A paint composition comprising an epoxy resin (a1) having a weight average molecular weight of 20000 or more, a rust preventive pigment (a2), a color pigment (a3), and an extender pigment (a4), the composition containing the rust preventive pigment (a2) in an amount of 1 to 70 parts by mass, the color pigment (a3) in an amount of 40 to 150 parts by mass, and the extender pigment (a4) in an amount of 40 to 150 parts by mass, per 100 parts by mass of the total solids content of the epoxy resin (a1).

Top Paint Composition (B):

A paint composition comprising an acrylic resin (b1), a polyisocyanate compound (b2), a silane coupling agent (b3), and barium sulfate (b4) having an average particle size of 0.01 to 5.0 μm, the composition containing the acrylic resin (b1) and the polyisocyanate compound (b2) in a proportion of 60 to 90 parts by mass to 10 to 40 parts by mass, and the barium sulfate (b4) in an amount of 1 to 50 parts by mass, per 100 parts by mass of the total solids content of the acrylic resin (b1) and the polyisocyanate compound (b2).

2. The method according to Item 1, wherein the primer paint composition (A) further comprises a silane coupling agent (a5) in an amount of 0.1 to 10 parts by mass, per 100 parts by mass of the total solids content of the epoxy resin (a1), 3. The method according to Item 1 or 2, wherein the primer paint composition (A) comprises talc as at least part of the extender pigment (a4) in an amount of 0.1 to 30 parts by mass, per 100 parts by mass of the total solids content of the epoxy resin (a1).

4. The method according to any one of Items 1 to 3, wherein the top paint composition (B) further comprises polyether polyol in an amount of 0.1 to 30 parts by mass, per 100 parts by mass of the total solids content of the acrylic resin (b1) and the polyisocyanate compound (b2).

5. Construction machinery or industrial machinery coated by using the method according to any one of Items 1 to 4.

Advantageous Effects of Invention

The present invention provides a coated article having excellent appearance, corrosion resistance, weatherability, and chipping resistance by a method for forming a multi-layer coating film comprising forming an uncured coating film of a primer paint composition, forming a top paint coating film on the uncured coating film, and simultaneously drying these films, i.e., by a wet-on-wet process.

Moreover, a coated article having excellent appearance can be obtained without being affected by the substrate shape, variations in application intervals, or temperatures of the undercoating paint and the top paint.

DESCRIPTION OF EMBODIMENTS

The present invention relates to a method for forming a multilayer coating film, comprising forming an uncured coating film of a specific primer paint composition (A) on a substrate, forming a top coating film of a specific top paint composition (B) on the uncured coating film, and simultaneously drying these films; and a coated article. The present invention is explained in detail below.

Primer Paint Composition (A)

The primer paint composition (A) is a paint composition comprising an epoxy resin (a1), rust preventive pigment (a2), color pigment (a3), and extender pigment (a4). The paint composition contains the rust preventive pigment (a2) in an amount of 1 to 70 parts by mass, the color pigment (a3) in an amount of 40 to 150 parts by mass, and the extender pigment (a4) in an amount of 40 to 150 parts by mass, per 100 parts by mass of the total solids content of the epoxy resin (a1), Epoxy Resin (a1)

The epoxy resin (a1) used in the present invention is preferably an aromatic-based epoxy resin obtained by a reaction between a polyphenol compound and epihalohydrin.

Examples of polyphenol compounds that can be used for forming the aromatic-based epoxy resin include bis(4-hydroxyphenyl)-2,2-propane (bisphenol A), bis(4-hydroxyphenyl)methane (bisphenol F), bis(4-hydroxycyclohexyl)methane (hydrogenated bisphenol F), 2,2-bis(4-hydroxycyclohexyl)propane (hydrogenated bisphenol A), 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, and the like.

As the epoxy resin (a1) obtained by a reaction between a polyphenol compound and epihalohydrin, epoxy resins derived from bisphenol A are preferable.

As the epoxy resin (a1), modified epoxy resins can be preferably used. Examples of modified epoxy resins include urethane modified epoxy resins, amine modified epoxy resins, acrylic modified epoxy resins, polyester modified epoxy resins, dimer acid modified, epoxy resins, and the like.

Examples of commercially available products of the modified epoxy resins include Arakyd 9201N, Arakyd 9203N, Arakyd 9205, Arakyd 9208, Modepics 401 (all produced by Arakawa Chemical Industries, Ltd., trade names), EPICLON H-405-40, EPICLON H-304-40, EPICLON H-403-45, EPICLON H-408-40 (all produced by DIC Corporation, trade names), Epokey 811, Epokey 872, Epokey 891 (all produced by Mitsui Chemicals, Inc., trade names), and the like.

The epoxy resin (a1) has a weight average molecular weight of 20000 or more, preferably 20000 to 60000, and more preferably 25000 to 55000.

The number average molecular weight or weight average molecular weight (mass average molecular weight) in the present specification is a value determined by converting the number average molecular weight or weight average molecular weight (mass average molecular weight) measured by gel permeation chromatography (GPC) based on the molecular weight of standard polystyrene. Specifically, "HLC8120GPC" (trade name, produced by Tosoh Corporation) is used as gel permeation chromatography, and four columns "TSKgel G-4000 HXL", "TSKgel G-3000 HXL", "TSKgel G-2500 HXL", and "TSKgel G-2000 HXL" (trade names, all produced by Tosoh Corporation) are used. Measurement was conducted under the following conditions: mobile phase: tetrahydrofuran; measurement temperature: 40° C.; flow rate: 1 ml/min.; and detector: RI.

Rust Preventive Pigment (a2)

The primer paint composition (A) contains a rust preventive pigment (a2) to improve corrosion resistance. Examples of the rust preventive pigment (a2) include zinc oxide, phosphite compounds, phosphate compounds, molybdate-based compounds, bismuth compounds, metal-ion exchanged silica, and the like.

Of the phosphite compounds, examples of phosphorous acid calcium salts include EXPERT NP1000, EXPERT NP-1020C, and the like. Examples of phosphorous acid aluminum salts include EXPERT NP-1100, EXPERT NP-1102 (all produced by Toho Ganryo Co., Ltd., trade names), and the like.

Examples of the phosphate compound include aluminum dihydrogen tripolyphosphate treated with a metal compound. Examples of the metal compound include chlorides, hydroxides, carbonates, sulfates, etc., of zinc, calcium, magnesium, manganese, bismuth, cobalt, tin, zirconium, titanium, strontium, copper, iron, lithium, aluminium, nickel, and sodium.

Examples of commercially available products of aluminum dihydrogen tripolyphosphate treated with the metal compound include K-WHITE 140, K-WHITE Ca650, K-WHITE 450H, K-WHITE G-105, K-WHITE K-105, K-WHITE K-82 (all produced by Tayca Corporation, trade names), and the like.

Examples of commercially available products of molybdate-based compounds include LF Bosei M-PSN, LF Bosei MC-400WR, LF Bosei PM-300, PM-308 (all produced by Kikuchi Color, trade names), and the like.

Examples of the bismuth compound include bismuth oxide, bismuth hydroxide, bismuth carbonate basic, bismuth nitrate, bismuth silicate, organic acid bismuth, and the like.

Examples of the metal-ion exchanged silica include calcium-ion exchanged silica and magnesium-ion exchanged silica. This metal-ion exchanged silica is modified with phosphoric acid, if necessary, to obtain phosphoric acid modified metal-ion exchanged silica. The above calcium-ion exchanged silica consists of silica particles obtained by introducing calcium ions into a microporous silica carrier by ion exchange. Examples of commercially available products of calcium-ion exchanged silica include Shieldex (registered trademark) C303, Shieldex AC-3, Shieldex C-5 (all produced by W.R. Grace & Co.), Sylomask 52 (produced by Fuji Silysia Chemical Ltd.), and the like.

The above magnesium-ion exchanged silica consists of silica particles obtained by introducing magnesium ions into a microporous silica carrier by ion exchange. Examples of commercially available products of magnesium-ion exchanged silica include Sylomask 52M (produced by Fuji Silysia Chemical Ltd.) and Novinox ACE-110 (produced by SNCZ, France). Of these rust preventive pigments (a2), calcium phosphate is particularly preferable to attain excellent appearance and corrosion resistance.

The amount of the rust preventive pigment (a2) in the primer paint composition (A) is 1 to 70 parts by mass, preferably 2 to 40 parts by mass, and more preferably 5 to 30 parts by mass, per 100 parts by mass of the solids content of the epoxy resin (a1). This amount range is desirable to achieve excellent paint stability, corrosion resistance, and chipping resistance.

Color Pigment (a3)

Examples of the color pigment (a3) include titanium white, zinc molybdate, calcium molybdate, carbon black, graphite, iron black, berlin blue, ultramarine blue, cobalt blue, copper phthalocyanine blue, indanthrone blue, chrome yellow, synthetic yellow iron oxide, transparent iron oxide red, bismuth vanadate, titanium yellow, zinc yellow, monoazo yellow, ocher, disazo, isoindolinone yellow, metallic complex azo yellow, quinophthalone yellow, benzimidazolone yellow, iron oxide red, monoazo red, unsubstituted quinacridone red, azo-lake (Mn salt), quinacridone magenta, anthanthrone orange, dianthraquinonyl red, perylene maroon, perylene red, diketo pyrrolo-pyrrole chrome vermilion, chlorination phthalocyanine green, bromination phthalocyanine green, pyrazolone orange, benzimidazolone orange, dioxazine violet, perylene violet, and the like.

Examples of commercially available products of titanium white include "Ti-Pure R-100", "Ti-Pure R-101", "Ti-Pure R-102", "Ti-Pure R-103", "Ti-Pure R-104", "Ti-Pure R-105", "Ti-Pure R-108", "Ti-Pure R-900", "Ti-Pure R-902", "Ti-Pure R-960", "Ti-Pure R-706", and "Ti-Pure R-931 (all produced by Du Pont Co., Ltd., trade names); "Tipaque CR-93", "Tipaque CR-95", and "Tipaque CR-97" (all produced by Ishihara Sangyo Kaisha Ltd., trade names); "JR-301", "JR-403", "JR-405", "JR-600A", "JR-605", "JR-600E", "3R805", "JR-806", "JR-701", and "JR-901" (all produced by Tayca Corporation, trade names); and the like.

The amount of the color pigment (a3) in the primer paint composition (A) is 40 to 150 parts by mass, preferably 45 to 130 parts by mass, and more preferably 50 to 100 parts by mass, per 100 parts by mass of the solids content of the epoxy resin (a1). This amount range is desirable to achieve excellent paint stability, weatherability, and chipping resistance.

Extender Pigment (a4)

Examples of the extender pigment (a4) include clay, silica, barium sulfate, talc, calcium carbonate, white carbon, diatomite, magnesium carbonate, aluminum flake, mica flake, and the like.

The amount of the extender pigment (a4) in the primer paint composition (A) is 40 to 150 parts by mass, preferably 50 to 120 parts by mass, and more preferably 55 to 110 parts by mass, per 100 parts by mass of the total solids content of the epoxy resin (a1). This amount range is desirable to achieve excellent paint stability, appearance, and chipping resistance.

Examples of commercially available products of talc include "SIMGON", "Talc MS", "MICRO ACE SG-95", "MICRO ACE P-8", "MICRO ACE P-6", "MICROACE P-4", "MICRO ACE P-3", "MICRO ACE P-2", "MICRO ACE L-1", "MICRO ACE K-1", "MICRO ACE L-G", "MICRO ACE S-3", and "NANO ACE D-1000" (all produced by Nippon Talc Co., Ltd., trade names); "P Talc", "PH Talc", "PS Talc", "TTK Talc", "TT Talc", "T Talc", "ST Talc", "High Toron", "High Toron A", "Micro light", "High Rack", and "High Micron HE5" (all produced by Takehara Kagaku Kogyo Co., Ltd., trade names); and the like.

In particular, as at least part of the extender pigment (a4), it is, preferable to contain talc in an amount of 0.1 to 30 parts by mass, preferably 3 to 25 parts by mass, and more preferably 7 to 20 parts by mass, per 100 parts by mass of the solids content of the epoxy resin (a1) in the primer paint composition (A). This amount range is desirable to attain excellent appearance and chipping resistance.

Examples of commercially available products of calcium carbonate include Nano Coat S-25 and MC Coat S-10 (both produced by Maruo Calcium Co., Ltd., trade names); Kasigloss (produced by Nichigo Mowinyl Co., Ltd.); Neolight SS and Neolight SA-200 (both Produced by Takehara Industries, trade names); and the like. Examples of commercially available products of barium sulfate include barium sulfate 100, baryta BF-1 (both produced by Sakai Chemical Industry Co., Ltd.), and the like.

In order to obtain a coated article having excellent appearance, corrosion resistance, weatherability, and chipping resistance by coating using a wet-on-wet process, the total amount of the oil absorption (Note i) of the rust preventive pigment (a2), color pigment (a3), and extender pigment (a4), per 100 g of the total solids content of the epoxy resin (a1) in the primer paint composition (A), is preferably 16 to 50 ml, more preferably 20 to 43 ml, and even more preferably 25 to 40 ml.

(Note i) Total amount of oil absorption: For example, the amounts of the pigments X, Y, and Z are 10 g, 20 g, and 30 g, respectively, per 100 g of the total solids of the epoxy resin (a1).

When the oil absorption (Note ii) of the pigment X is $X_s$ (ml/100 g), the oil absorption (Note ii) of the pigment Y is $Y_s$ (ml/100 g), and the oil absorption (Note ii) of the pigment Z is $Z_s$ (ml/100 g), the total amount of oil absorption can be obtained by the following formula.

(Note ii) The total amount of oil absorption of pigments= $[X_s \times (10/100)] + [Y_s \times (20/100)] + [Z_s \times (30/100)]$ Oil absorption: The oil absorption of each pigment is the value of oil absorption (ml/100 g) determined according to a method described in the boiled linseed oil method (JIS K 5101-13-2).

The primer paint composition (A) may include a silane coupling agent (a5), ultraviolet ray absorbent, light stabilizer, rheology control agent, antifoaming agent, pigment dispersant, surface adjusting agent, surfactant, curing agent, curing catalyst, thickener, preservative, antifreezing agent, or the like, as necessary.

Silane Coupling Agent (a5)

The primer paint composition (A) used in the present invention may include a silane coupling agent (a5) in order to improve corrosion resistance<Examples of the silane coupling agent (a5) include amino group-containing silane coupling agents, such as γ-aminopropyltrimethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, γ-ureidopropyltriethoxysilane, N-(β-(N-vinylbenzylaminoethyl)-γ-aminopropyltrimethoxysilane, and γ-anilinopropyltrimethoxysilane; epoxy group-containing silane coupling agents, such as γ-glycidoxypropylmethyldimethoxysilane, γ-glycidoxypropyltriethoxysilane, and β-(3,4-epoxycyclohexyl)ethyltrimethoxysilane; carboxy-containing silane coupling agents, such as β-carboxylethylphenylbis(2-methoxyethoxy)silane, and N-β-(N-carboxymethylaminoethyl)-γ-aminopropyltrimethoxysilane; and the like.

Of these, amino group-containing silane coupling agents and epoxy group-containing silane coupling agents are desirable to improve corrosion resistance. These silane coupling agents may be used singly, or in a combination of two or more.

Examples of commercially available products of the silane coupling agent (a5) include KBM-402, ICBM-403, KBM-502, KBM-503, KBM-603, KBE-903, KBE-602, and KBE-603 (all produced by Shin-Etsu Chemical Co., Ltd., trade names).

When the silane coupling agent (a5) is incorporated in the present invention, the amount of the silane coupling agent (a5) is 0.1 to 10 parts by mass, preferably 0.5 to 7 parts by mass, and more preferably 0.8 to 3.5 parts by mass, per 100 parts by mass of the solids content of the epoxy resin (a1). This amount range is desirable to achieve excellent appearance and corrosion resistance.

Top Paint Composition

The top paint composition is a composition containing an acrylic resin (b1), polyisocyanate compound (b2), silane coupling agent (b3), and barium sulfate (b4) having an average particle size of 0.01 to 5.0 μm. The paint composition contains the acrylic resin (b1) and the polyisocyanate compound (b2) in a proportion, of 60 to 90 parts by mass: 10 to 40 parts by mass, and the barium sulfate (b4) in an amount of 1 to 50 parts by mass, per 100 parts by mass of the total solids content of the acrylic resin (b1) and polyisocyanate compound (b2).

Acrylic Resin (b1)

The acrylic resin (b1) is obtained by copolymerizing a mixture comprising a hydroxy group-containing radically polymerizable unsaturated monomer (b11) and another radically polymerizable unsaturated monomer (b12).

Examples of the hydroxy group-containing radically polymerizable unsaturated monomer (b11) include 2-hydroxyethyl (meth)acrylate, 2-hydroxypropyl (meth)acrylate, 3-hydroxypropyl (meth)acrylate, and hydroxybutyl (meth)acrylate, as well as PLACCEL FM1, PLACCEL FM2, PLACCEL FM3, PLACCEL FA1, PLACCEL FA2, and PLACCEL FA3 (all produced by Daicel Corporation, trade names, caprolactone-modified hydroxy(meth)acrylates); and the like.

In the present specification, the term "(meth)acrylate" means acrylate or methacrylate. The term "(meth)acryloyl" means acryloyl or methacryloyl. The term "(meth)acrylamide" means acrylamide or methacrylamide.

Examples of another radically polymerizable unsaturated monomer (b12) include carboxy group-containing radically polymerizable unsaturated monomers, such as acrylic acid, methacrylic acid, crotonic acid, itaconic acid, maleic acid, and fumaric acid; alkoxysilyl group-containing unsaturated monomers, such as γ-(meth)acryloyloxypropyltrimethoxysilane, γ-(meth)acryloyloxypropylmethyldimethoxysilane, γ-(meth)acryloyloxypropyltriethoxysilane, and vinyltrimethoxysilane; $C_{1-18}$ alkyl or cycloalkyl (meth)acrylates, such as methyl (meth)acrylate, ethyl (meth)acrylate, propyl (meth)acrylate, butyl (meth)acrylate, hexyl (meth)acrylate, octyl (meth)acrylate, lauryl (meth)acrylate, 2-ethylhexyl (meth)acrylate, and cyclohexyl (meth)acrylate; aromatic vinyl monomers, such as styrene; and (meth)acrylamide monomers, such as (meth)acrylic acid amide, N,N-dimethylol (meth)acrylamide, N,N-dimethoxymethyl (meth)acrylamide, N,N-di-n-butoxymethyl (meth)acrylamide, N-methoxymethyl-N-methylol (meth)acrylamide, N-methylol (meth)acrylamide, and N-alkoxymethyl (meth)acrylamide group-containing unsaturated monomer represented by formula (1) below:

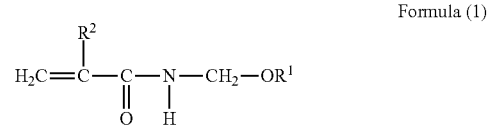

Formula (1)

wherein $R^1$ represents $C_{1-8}$ alkyl, and $R^2$ represents a hydrogen atom or methyl.

Examples of the N-alkoxymethyl(meth)acrylamide group-containing unsaturated monomer represented by formula (1) include N-methoxymethyl (meth)acrylamide, N-ethoxymethyl (meth)acrylamide, N-propoxymethyl (meth)acrylamide, N-isopropoxymethyl (meth)acrylamide, N-butoxymethyl (meth)acrylamide, N-isobutoxymethyl (meth)acrylamide, N-hexoxymethyl (meth)acrylamide, and N-isohexoxymethyl (meth)acrylamide.

The amounts of such radical polymerizable unsaturated monomers are preferably such that the amount of the hydroxy group-containing radical polymerizable unsaturated monomer (b11) is 1 to 40 mass %, preferably 5 to 30 mass %; and the amount of another radical polymerizable unsaturated monomer (b12) is 60 to 99 mass %, and preferably 70 to 95 mass %, based on the total amount of radical polymerizable unsaturated monomers.

The acrylic resin (b1) can be obtained by mixing the hydroxy group-containing radical polymerizable unsaturated monomer (b11) and another radical polymerizable unsaturated monomer (b12) to perform a radical polymerization reaction in an organic solvent that is kept at about 50 to 300° C., preferably 60 to 250° C. in the presence of as polymerization initiator and an inert gas such as nitrogen for about 1 to 24 hours, preferably about 2 to 10 hours.

As part of the acrylic resin (b1), a polyester resin-modified acrylic resin that is modified with a polyester resin can also be used. The polyester resin-modified acrylic resin can be produced by a conventionally known method. Examples include a method of polymerizing a polyester resin having a polymerizable unsaturated group with an acrylic resin (b1) that is polymerizable therewith. The use of the polyester resin-modified acrylic resin for the top paint composition (B) can improve corrosion resistance.

Preferable examples of organic solvents used in the radical polymerization reaction include alcohols, such as n-propanol, isopropanol, n-butanol, t-butyl alcohol, and isobutyl alcohol; and ethers, such as ethylene glycol monobutyl ether, methyl carbitol, 2-methoxyethanol, 2-ethoxyethanol, 2-isopropoxyethanol, 2-butoxyethanol, ethylene glycol monomethyl ether, ethylene glycol monoethyl ether, ethylene glycol monobutyl ether, 1-methoxy-2-propanol, 1-ethoxy-2-propanol, and propylene glycol monomethyl ether. In addition to the above, aromatic solvents, such as xylene and toluene; ketones, such as acetone, methylethylketone, 2-pentanone, 2-hexanone, methyl isobutyl ketone, isophorone, and cyclohexanone; and esters, such as methyl acetate, ethyl acetate, pentyl acetate, 3-methoxybutyl acetate, 2-ethyl acetate, benzyl acetate, cyclohexyl acetate, methyl propionate, and ethyl propionate, may be optionally used in combination.

Examples of polymerization initiators used in the radical polymerization reaction include benzoyl peroxide, di-t-butyl hydroperoxide, t-butyl hydroperoxide, cumyl peroxide, cumene hydroperoxide, t-butylperoxy benzoate, lauryl peroxide, acetyl peroxide, azobisisobutyronitrile, and the like.

The obtained acrylic resin (b1) has a weight average molecular weight of 3,000 to 50,000, particularly preferably 4,000 to 15,000, an acid value of 1 to 20 mg KOH/g, and a hydroxyl value of 40 to 200 mg KOH/g.

Polyisocyanate Compound (b2)

The polyisocyanate compound (b2) is a compound having at least two free isocyanate groups per molecule.

As the polyisocyanate compound (b2), compounds conventionally used for production of polyurethane can be used. Examples include $C_{2-18}$ aliphatic polyisocyanate compounds, $C_{4-15}$ alicyclic polyisocyanate compounds, $C_{8-15}$ aliphatic-aromatic polyisocyanate compounds, $C_{6-20}$ (except for carbon in an NCO group, the same applies below) aromatic polyisocyanate compounds, and crude products of them, modified products of these polyisocyanate compounds, and mixtures of two or more of these.

Examples of aliphatic polyisocyanate compounds include ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl)carbonate, 2-isocyanatoethyl-2,6-diisocyanato hexanoate, and the like.

Examples of alicyclic polyisocyanate compounds include isophorone diisocyanate (IPDI), dicyclohexylmethane-4,4'-diisocyanate (hydrogenated MDI), cyclohexylene diisocyanate, methyl cyclohexylene diisocyanate (hydrogenated TDI), bis(2-isocyanatoethyl)-4-cyclohexane-1,2-dicarboxylate, 2,5- and/or 2,6-norbornene diisocyanate, and the like.

Examples of aliphatic-aromatic polyisocyanate compounds include m- and/or p-xylene diisocyanate (XDI), α,α,α',α'-tetramethylxylylenene diisocyanate (TMXDI), and the like.

Examples of aromatic polyisocyanate compounds include 1,3- and/or 1,4-phenylene diisocyanate, 2,4- and/or 2,6-tolylene diisocyanate (TDI), crude TDI, 2,4'- and/or 4,4'-biphenylmethane diisocyanate (MDI), 4,4'-diisocyanatobiphenyl, 3,3'-dimethyl-4,4'-diisocyanatobiphenyl, 3,3'-dimethyl-4,4'-diisocyanatodiphenylmethane, crude MDI, 1,5-naphthylenediisocyanate, 4,4',4"-triphenylmethane triisocyanate, m- and p-isocyanatophenylsulfonyl isocyanate, and the Like.

Modified products of the polyisocyanate compound include modified MDI (urethane-modified MDI, carbodiimide-modified MDI, trihydrocarbylphosphate-modified MDI), urethane-modified TDI, biuret-modified HDI, isocyanurate-modified HDI, isocyanurate-modified IPDI, and like modified products of polyisocyanate; mixtures of two or more of these (e.g., combination use of modified MDI and urethane-modified TDI (isocyanate group-containing prepolymer)).

In addition to the polyisocyanate compounds mentioned above, those obtained by blocking isocyanate groups of the polyisocyanate compounds with a blocking agent can also be used. Examples of blocking agents include phenols; oximes; lactams; alcohols; mercaptans; pyrazoles; active methylene compounds such as diethyl malonate; and the like. When the blocked polyisocyanate compound is used, a dissociation catalyst of a blocking agent is used in combination, and it is preferable to perform heating and drying at 80° C. or more, preferably 90 to 180° C.

In view of corrosion resistance and weatherability, preferable examples of the polyisocyanate compound include aliphatic polyisocyanate compounds and alicyclic polyisocyanate compounds. The polyisocyanate compound preferably has a number average molecular weight of 3,000 or less, particularly Preferably within the range of 100 to 1,500.

Examples of commercially available products of such polyisocyanate compounds include Bayhydur TP-LS2550 and Sumidur N3300 (both produced by Sumika Bayer Urethane Co., Ltd.); TPA100 (produced by Asahi Kasei Chemicals Corporation); BASONAT HI100 (produced by BASF); and the like.

The amount of the acrylic resin (b1) is 60 to 90 parts by mass, preferably 65 to 85 parts by mass on a solids basis; and the amount of the polyisocyanate compound (b2) is 10 to 40 parts by mass, preferably 15 to 35 parts by mass on a solids basis, per 100 parts by mass of the total solids content of the acrylic resin (b1) and the polyisocyanate compound (b2). This amount range is desirable to attain excellent paint stability and coating film curability.

Silane Coupling Agent (b3)

The primer paint composition (B) used in the present invention may include a silane coupling agent (b3) in order to improve adhesion to the undercoating (primer coating) film. Examples of the silane coupling agent (b3) include amino group-containing silane coupling agents, such as γ-aminopropyltrimethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, γ-ureidopropyltriethoxysilane, N-(β-(N-vinylbenzylaminoethyl)-γ-aminopropyltrimethoxysilane), and γ-anilinopropyltrimethoxysilane; epoxy group-containing silane coupling agents, such as γ-glycidoxypropylmethyldimethoxysilane, γ-glycidoxypropyltriethoxysilane, and β-(3,4-epoxycyclohexyl)ethyltrimethoxysilane; carboxy-containing silane coupling agents, such as β-carboxyethylphenylbis(2-methoxyethoxy)silane, and N-β-(N-carboxymethylaminoethyl)-γ-aminopropyltrimethoxysilane; and the like.

Of these, amino group-containing silane coupling agents and epoxy group-containing silane coupling agents are desirable to improve corrosion resistance. These silane coupling agents may be used singly, or in a combination of two or more.

Examples of commercially available products of the silane coupling agent (b3) include KBM-402, KBM-403, KBM-502, KBM-503, KBM-603, KBE-903, KBE-602, and KBE-603 (all produced by Shin-Etsu Chemical Co., Ltd., trade names).

The amount of the silane coupling agent (b3) is 0.1 to 10 parts by mass, preferably 0.5 to 5 parts by mass, and even more preferably 0.8 to 3.5 parts by mass, per 100 parts by mass of the total solids content of the acrylic resin (b1) and the polyisocyanate compound (b2). This amount range is desirable to attain excellent appearance and corrosion resistance.

Barium Sulfate having an Average Particle Size of 0.01 to 5 μm (b4)

The top paint composition used in the present invention contains barium sulfate (b4) having an average particle size of 0.01 to 5 μm, and preferably 0.05 to 1 μm (hereinbelow, barium sulfate having an average particle size of 0.01 to 5 μm (b4) is simply referred to as barium sulfate (b4)).

Examples of commercially available products of barium sulfate (b4) include Barifine BF-20 (produced by Sakai Chemical Industry Co., Ltd., trade name, barium sulfate having an average particle size of 0.03 μm), BARIACE B-30

(produced by Sakai Chemical Industry Co., Ltd., trade name, barium sulfate having an average particle size of 0.3 μm), and SPARWITE W-5HB (Sino-Can, trade name, barium-sulfate powder, average particle size: 1.6 μm). In this specification, the average particle size is measured by using a UPA-EX250 (trade name, produced by Nikkiso Co., Ltd., a size distribution measuring device according to a dynamic light scattering method).

The amount of barium sulfate (b4) in the top paint composition (B) is 1 to 50 parts by mass, preferably 5 to 45 Parts by mass, and more preferably 10 to 40 parts by mass, per 100 parts by mass of the total solids content of the acrylic resin (b1) and polyisocyanate compound (b2). With this amount range, a coating film having excellent appearance, weatherability, and chipping resistance can be obtained.

Polyether Polyol

The top paint composition used in the present invention can use polyether polyol as necessary to improve appearance etc.

Examples of polyether polyol include compounds obtained by adding an alkylene oxide to an active hydrogen-containing compound, such as polyhydric alcohol, polyhydric phenol, or polycarboxylic acid.

Examples of active hydrogen-containing compounds include water, polyhydric alcohols (ethylene glycol, diethylene glycol, trimethylene glycol, propylene glycol, 1,4-butanediol, 1,6-hexanediol, neopentyl glycol, 1,4-dihydroxymethylcyclohexane, cyclohexylene glycol, and like dihydric alcohols; glycerin, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerin, pentaglycerin, 1,2,4-butanetriol, 1,2,4-pentanetriol, trimethylolethane, trimethylolpropane, and like trihydric alcohols; pentaerythritol, 1,2,3,4-pentanetetrol, 2,3,4,5-hexanetetrol, 1,2,4,5-pentanetetrol, 1,3,4,5-hexanetetrol, diglycerin, sorbitan, and like tetrahydric alcohols; adonitol, arabitol, xylitol, triglycerin, and like pentahydric alcohols; dipentaerythritol, sorbitol, mannitol, iditol, inositol, dulcitol, talose, allose, and like hexahydric alcohols; sucrose and like octahydric alcohols; polyglycerin, and the like); polyhydric phenols (polyhydric phenols (e.g., pyrogallol, hydroquinone, and phloroglucin), bisphenols (e.g., bisphenol A and bisphenol sulfone)); polycarboxylic acids (aliphatic polycarboxylic acids (e.g., succinic acid and adipic acid), aromatic polycarboxylic acids (e.g., phthalic acid, terephthalic acid, and trimellitic acid)); and mixtures of two or more of these.

Preferable examples of trivalent or higher-valent alcohol for forming polyetherpolyol having at least three hydroxy groups per molecule include glycerin, trimethylolethane, trimethylolpropane, pentaerythritol, sorbitan, sorbitol, and the like.

The polyether polyol can usually be obtained by performing an addition reaction of an alkylene oxide to the active hydrogen-containing compound in the presence of an alkali catalyst at a temperature of 60 to 160° C. under ordinary pressure or increased pressure by a usual method. Examples of alkylene oxides include ethylene oxide, propylene oxide, butylene oxide, and the like.

Of polyether polyols, a particularly preferable example is a compound represented by formula (2) below,

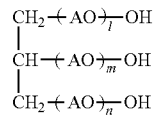

Formula (2)

wherein l, m, and n are each independently an integer of 1 or more, and l+m+n=3 to 15; and each A in (AO)l, (AO)m, and (AO)n may be identical or different, and represents ethylene and/or propylene.

Examples of commercially available products of polyether polyol include Sannix GP-600, Sannix GP-1000, Excenol 430, Excenol 385SO, Excenol 450ED, Excenol 500ED, Excenol 750ED (Asahi Glass Co., Ltd., trade name), Adeka polyether (Adeka Corporation, trade name), Actcol T-1000 (Mitsui Chemicals, Inc., trade name), and the like. Such polyether polyol has a number average molecular weight of less than 3,000, preferably 90 to 2,000, and more preferably 500 to 1,500.

When polyether polyol is incorporated in the top paint composition (B), the amount of the polyether polyol is 0.1 to 30 parts by mass, preferably 1 to 20 parts by mass, and more preferably 3 to 15 parts by mass, per 100 parts by mass of the total solids content of the acrylic resin (b1) and the polyisocyanate compound (b2). This amount range is desirable to obtain a coating film with excellent appearance.

The top paint composition (B) may also include, as necessary, a color pigment, extender pigment, rust preventive Pigment, rheology control agent, ultraviolet absorber, light stabilizer, antifoaming agent, pigment dispersant, surface adjusting agent, surfactant, curing catalyst, thickener, preservative, antifreezing agent, chelating agent, and the like.

As the rust preventive pigment, pigments listed in the rust preventive pigment (a2) section can be used. Examples include zinc oxide, phosphite compounds, phosphate compounds, and the like. As the color pigment, pigments listed in the color pigment (a3) section can be used. Examples include titanium dioxide, bent imidazolone yellow, iron oxide red, and the like. As the extender pigment, those listed in the extender pigment (a4) section can be used. Examples include talc, barium sulfate, calcium carbonate, clay, and the like.

The rheology control agent is used for improving appearance by controlling the fluidity of a paint Examples of rheology control agents include clay minerals (e.g., metal silicate, montmorillonite), acryls (e.g., those containing in a molecule a structure of polymer or oligamer of acrylic acid ester or methacrylic acid ester), polyolefins (e.g., polyethylene, polypropylene), amides (higher-fatty-acid amide, polyimide, oligomer, etc.), polycarboxylic acids (including derivatives containing in a molecule at least two carboxyl groups), cellulose (including various derivatives, such as cellulose nitrate, acetyl cellulose, and cellulose ether), urethane (polymer or oligomer having an urethane structure in a molecule), urea (polymer or oligomer having a urea structure in a molecule), urethane urea (polymer or oligomer having a urethane structure and urea structure in a molecule), and the like.

Examples of commercially available products of rheology control agents include amide waxes, such as Disparlon 6900 (Kusumoto Chemicals, Ltd.) and Thixol W-300 (Kyoeisha Chemical Co., Ltd.); polyethylene waxes, such as Disparlon 4200 (Kusumoto Chemicals, Ltd.); cellulose-based rheology control agents, such as CAB (cellulose acetate butyrate, produced by Eastman Chemical Products, Inc.), HEC (hydroxyethyl cellulose), hydrophobized HEC, and CMC (carboxy methylcellulose); urethane urea-based rheology control agents, such as BYK-410, BYK-411, BYK-420, and BYK-425 (all produced by BYK-Chemie); sulfuric acid ester-based anionic rheology control agents, such as Flownon SDR-80 (Kyoeisha Chemical Co., Ltd.); polyolefin-based rheology control agents, such as Flownon SA-345HF (Kyoeisha Chemical Co., Ltd.); and higher fatty acid amide rheology control agents, such as Flownon HR-4AF (Kyoeisha Chemical Co., Ltd.).

The amount of the rheology control agent when incorporated is 0.1 to 20 parts by mass, preferably 0.5 to 15 parts by mass, and more preferably 0.9 to 5 parts by mass, per 100 parts by mass of the total solids content of the acrylic resin (b1) and the polyisocyanate compound (b2).

Method for Forming a Multilayer Coating Film

The method for forming a multilayer coating film of the present invention is a method comprising forming the uncured coating film of the primer paint composition (A) on a substrate, forming the top coating film of the top paint composition (B) on the uncured coating film, and simultaneously drying the films.

Examples of the substrate include cold-rolled steel sheets, black steel sheets, zinc-alloy-plated steel sheets, electrogalvanized steel sheets, and the like. These substrates may be subjected to shot-blasting, surface adjustment, surface treatment, or the like.

The primer paint composition (A) can be applied by a method such as immersion coating, brush coating, roll brush coating, spray coating, roll coating, spin coating, dip coating, bar coating, flow coating, electrostatic coating, airless coating, electrodeposition coating, and dye coating. The film thickness (when dried) is usually 10 to 150 µm, and preferably 30 to 80 µm.

The top paint composition (B) can be applied to the uncured coating film of the primer paint composition (A) by a method such as immersion coating, brush coating, roll brush coating, spray coating, roll coating, spin coating, dip coating, bar coating, flow coating, electrostatic coating, airless coating, electrodeposition coating, and dye coating. The film thickness (when dried) is usually 10 to 150 µm, and preferably 30 to 80 µm. Subsequently, drying is performed at ordinary temperature to 160° C. for 10 to 120 minutes, and preferably at 60 to 120° C. for 20 to 90 minutes, thus obtaining a Multilayer coating film.

In the method for forming a multilayer coating film of the present invention, the uncured coating film of the primer paint composition (A) during the application of the top paint composition (B) has a viscosity of 5 Pa·s to 1000 Pa·s, preferably 10 Pa·s to 1000 Pa·s, and more preferably 30 Pa·s to 800 Pa·s to attain excellent appearance.

The viscosity can be measured under a temperature condition that is almost the same as that of the uncured coating film during the application of the top paint composition (B), by a method used in a coating film performance test described in the Examples below.

The viscosity of the uncured coating film can be adjusted to the above viscosity range by performing setting or preheating at ordinary temperature, as required, after applying the primer paint composition (A) to form the uncured coating film.

From the viewpoint of appearance, the value ΔNV obtained by subtracting the value (NV1) of the application mass solids content (%) of the primer paint composition (A) from the value (NV2) of the mass solids content (%) of the uncured coating film of the primer paint composition (A) during the application of the top paint composition is within the range of 15 or more, preferably 18 to 45, and more preferably 20 to 40.

The value ΔNV can be obtained according to a method described in a coating film performance test described below.

EXAMPLES

The present invention is described below in more detail with reference to Production Examples, Examples, and Comparative Examples. However, the present invention is not limited to these. In the examples, "parts" and "%" are expressed on a mass basis.

Production of Primer Paint Composition

Production Example 1

Production Example of primer paint composition No. 1

Primer paint composition No, 1 was obtained by steps 1 and 2 shown below.

Step 1:

Xylene and Swasol 1000 (produced by Cosmo Oil Co., Ltd., aromatic hydrocarbon-based solvent) were added in appropriate amounts to 50 parts of Arakyd 9205 (Note 1), 20 parts of EXPERT NP1000 (Note 4), 70 parts of Ti-Pure R-902 (Note 6), 40 parts of LAKABAR SF (Note 8), and 70 parts of Neolight SA-200 (Note 10). The mixture was dispersed in a sand mill, thus obtaining a pigment dispersion paste.

Step 2:

50 parts (solids content) of Arakyd 9205 (Note 1) and 1 part of Disparlon A 603-20X (Note 13) were added to the pigment dispersion paste obtained above, and Xylene and Swasol 1000 (produced by Cosmo Oil Co., Ltd., aromatic hydrocarbon-based solvent) were added thereto. The mixture was stirred, and the solids content was adjusted, thereby obtaining primer paint composition No. 1 having a solids content of 70%.

Production Examples 2 to 11

Production Examples of Primer Paint Compositions Nos. 2 to 11

Primer paint compositions Nos. 2 to 11 were obtained as in Production Example 1, except that the component ratios shown in Table 1 were used.

TABLE 1

| | | | | | Production Example No. | | | | | | | | | | |
|---|---|---|---|---|---|---|---|---|---|---|---|---|---|---|---|
| | | | | | 1 | 2 | 3 | 4 | 5 | 6 | 7 | 8 | 9 | 10 | 11 |
| | | Primer paint composition No. | | | 1 | 2 | 3 | 4 | 5 | 6 | 7 | 8 | 9 | 10 | 11 |
| Primer paint composition Component ratio | Step 1 Pigment dispersion paste | (a1) | Arakyd 9205 (weight average molecular weight: 30,000) | (Note 1) | 50 | | | 50 | | 50 | 50 | 50 | 50 | 50 | |
| | | | Arakyd 9201N (weight average molecular weight: 50,000) | (Note 2) | | 50 | | | 50 | | | | | | 50 |

TABLE 1-continued

| | | | | Production Example No. | | | | | | | | | | |
|---|---|---|---|---|---|---|---|---|---|---|---|---|---|---|
| | | | | 1 | 2 | 3 | 4 | 5 | 6 | 7 | 8 | 9 | 10 | 11 |
| | | | Arakyd 9203N (weight average molecular weight: 30,000) | (Note 3) | | 50 | | | | | | | | |
| | | (a2) | EXPERT NP1000 | (Note 4) | 20 | 20 | 20 | 20 | | 20 | 40 | 20 | 20 | 20 | 20 |
| | | | K-WHITE 140 | (Note 5) | | | | | 20 | | | | | | |
| | | (a3) | Ti-Pure R-902 | (Note 6) | 70 | 70 | 70 | | | 50 | 50 | 50 | 50 | 50 | 100 |
| | | | Tipaque CR-93 | (Note 7) | | | | 70 | 45 | | | | | | |
| | | (a4) | LAKABAR SF | (Note 8) | 40 | 40 | 40 | | 30 | 30 | 30 | 30 | 30 | 30 | 30 |
| | | | Barifine BF-20 | (Note 9) | | | | 40 | 30 | 30 | 30 | 30 | 30 | 30 | 30 |
| | | | Neolight SA-200 | (Note 10) | 70 | 70 | 70 | 40 | 30 | 30 | 30 | 30 | 30 | 30 | 30 |
| | | | T Talc | (Note 11) | | | | | | | | 5 | 25 | 10 | 25 |
| Step 2 Paint preparation | | (a1) | Arakyd 9205 | (Note 1) | 50 | | 50 | | 50 | 50 | 50 | 50 | 50 | | |
| | | | Arakyd 9201N (weight average molecular weight: 50,000) | (Note 2) | | 50 | | 50 | | | | | | | 50 |
| | | | Arakyd 9203N (weight average molecular weight: 30,000) | (Note 3) | | | 50 | | | | | | | | |
| | Others | | KBM-403 | (Note 12) | | | | | | 0.5 | 7 | | | 5 | |
| | | | Disparlon A603-20X | (Note 13) | 1 | 1 | 1 | 1 | 1 | 1 | 1 | 1 | 1 | 1 | 1 |

Numerals in the table represent the mass solids content.

Comparative Production Examples 1 to 7

Production Examples of Primer Paint Compositions Nos. 12 to 18

Primer paint compositions Nos. 12 to 18 were obtained as in Production Example 1, except that the component ratios shown in Table 2 were used.

TABLE 2

| | | | | | Comparative Production Example No. | | | | | | |
|---|---|---|---|---|---|---|---|---|---|---|---|
| | | | | | 1 | 2 | 3 | 4 | 5 | 6 | 7 |
| | | | Primer paint composition No. | | 12 | 13 | 14 | 15 | 16 | 17 | 18 |
| Primer paint composition Component ratio | Step 1 Pigment Dispersion paste | (a1) | Arakyd 9205 (weight average molecular weight: 30,000) | (Note 1) | | | | 50 | 50 | | 50 | 50 |
| | | | Epokey 859 (weight average molecular weight: 18,000) | (Note 14) | 50 | | | | | | |
| | | | Modepics 601 (weight average molecular weight: 10,000) | (Note 15) | | 50 | | | 50 | | |
| | | (a2) | EXPERT NP1000 | (Note 4) | 20 | 20 | 50 | 20 | 20 | 20 | 5 |
| | | | K-WHITE 140 | (Note 5) | | | | | | | |
| | | (a3) | Ti-Pure R-902 | (Note 6) | 70 | 70 | 100 | | 70 | 100 | 50 |
| | | | Tipaque CR-93 | (Note 7) | | | | 50 | | | |
| | | (a4) | LAKABAR SF | (Note 8) | 40 | 40 | 80 | | 40 | 55 | |
| | | | Barifine BF-20 | (Note 9) | | | | 10 | | | 40 |
| | | | Neolight SA-200 | (Note 10) | 70 | 70 | 80 | 10 | 70 | 55 | |
| | | | T TALC | (Note 11) | | | | | | 50 | |
| | Step 2 Paint | (a1) | Arakyd 9205 | (Note 1) | | | | 50 | 50 | 50 | 50 |
| | | | Epokey 859 (weight average molecular weight: 18,000) | (Note 14) | 50 | | | | | | |
| | | | Modepics 601 (weight average molecular weight: 10,000) | (Note 15) | | 50 | | | 50 | | |
| | Others | | KBM-403 | (Note 12) | | | | | 20 | | |
| | | | Disparlon A603-20X | (Note 13) | 1 | 1 | 1 | 1 | 1 | 1 | 1 |

Numerals in the table represent the mass solids content.

(Note 1) Arakyd 9205: Arakawa Chemical Industries, Ltd., trade name, modified bisphenol A type epoxy resin, weight average molecular weight of 30,000, glass transition temperature of 84° C.

(Note 2) Arakyd 9201: Arakawa Chemical Industries, Ltd., trade name, modified bisphenol A type epoxy resin, weight average molecular weight of 50,000, glass transition temperature of 94° C.

(Note 3) Arakyd 9203: Arakawa Chemical Industries, Ltd., trade name, modified bisphenol A type epoxy resin, weight average molecular weight of 30,000, glass transition temperature of 84° C.

(Note 4) EXPERT NP1000: Toho Ganryo Kogyo Co., Ltd., trade name, basic phosphorous acid calcium, oil absorption of 40 ml/100 g (Note 5) K-WHITE 140: Kikuchi Color Co., Ltd., trade name, aluminum dihydrogen triphosphate, oil absorption of 32 ml/100 g (Note 6) Ti-Pure R-902: Du Pont Co., Ltd., trade name, titanium white, oil absorption of 16 ml/100 g (Note 7) Tipaque CR-93: Ishihara Sangyo Kaisha, Ltd., trade name, titanium white, oil absorption of 20 ml/100 g (Note 8) LAKABAR SF: produced by LAKAVISUTH, trade name, barium sulfate powder, average particle size of 10.4 μm, oil absorption of 10 ml/100 g (Note 9) Barifine BF-20: produced by Sakai Chemical Industry Co., Ltd., trade name, barium sulfate having an average particle size of 0.03 μm, oil absorption of 24 ml/100 g (Note 10) Neolight SA-200, Takehara Kagaku Kogyo Co., Ltd., trade name, calcium carbonate, oil absorption of 32 ml/100 g (Note 11) T talc: produced by Takehara Kagaku Kogyo Co., Ltd., trade name, talc, average particle size of 9.0 μm, oil absorption of 27 ml/100 g (Note 12) KBM-403: Shin-Etsu Chemical Co., Ltd., trade name, epoxy group-containing silane coupling agent (Note 13) Disparlon A603-20X: Kusumoto Chemicals, Ltd., tradename, thickener (Note 14) Epokey 859: Mitsui Chemicals, Inc., trade name, modified epoxy resin, weight average molecular weight of 18,000

(Note 15) Modepics 601: Arakawa Chemical Industries, Ltd., modified bisphenol A-type epoxy resin, weight average molecular weight of 10,000

Production of Top Paint Composition

Production Example 16

Production of Acrylic Resin Solution 28 parts of Swasol 1000 (Cosmo Oil Co., Ltd., aromatic hydrocarbon-based solvent), 85 parts of toluene, 41.6 parts of styrene, 6.9 parts of n-butyl acrylate, 19 parts of isobutyl methacrylate, 15 parts of PLACCEL FM-3 (Note 16), 17 parts of 2-hydroxyethyl methacrylate, 0.5 parts of acrylic acid, and 8 parts of di-tert-butyl hydroperoxide were reacted under nitrogen gas at 110° C., thus obtaining an acrylic resin solution having a solids mass content of 45%. The obtained acrylic resin has an acid value of 3.9 mg KOH/g, hydroxy value of 94.9 mg KOH/g, and weight average molecular weight of 11,000.

(Note 16) PLACCEL FM-3: Daicel Chemical Industries, Ltd., trade name, ε-caprolactone modified vinyl monomer of 2-hydroxyethyl acrylate Production Example 17

Production of Polyester Modified Acrylic Resin Solution (according to JP1996-302204A)

143 parts of Beckosol P470-70 (produced by DIC Corporation, trade name, soybean oil-based long-oil alkyd resin) and 457 parts of mineral spirit were added to a four-necked flask equipped with a stirrer, a thermometer, a condenser tube, and a nitrogen gas inlet; and heated to 100° C.

Subsequently, a mixture containing 200 parts of styrene, 489 parts of isobutyl methacrylate, 106 parts of 2-ethylhexyl acrylate, 100 parts of 2-hydroxyethyl methacrylate, 5 parts of methacrylic acid, 200 parts of mineral spirit, 300 parts of "Solvesso 100", and 10 parts of benzoyl peroxide was added dropwise thereto over 4 hours.

After the completion of the dropwise addition, reaction was performed for 8 hours at the same temperature, thereby obtaining a polyester modified acrylic resin solution having a solids mass content of 50%. The obtained polyester modified acrylic resin has an acid value of 2.5 mg KOH/g and a weight average molecular weight of 9,000.

Production Example 12

Production Example of Top Paint composition No, 1

80 parts (solids content) of the acrylic resin solution obtained in Production Example 16, 12 parts of Tipaque CR-93 (Note 7), 12 parts of Hostaperm Yellow H-3G (Note 17), 15 parts of Barifine BF-20 (Note 18), 12 parts of Bayferrox 4905 (Note 21), and 1 part of TINUVIN 292 (Note 22) were mixed, and the solids content of the mixture was adjusted by Swasol 1000 (produced by Cosmo Oil Co., Ltd., aromatic hydrocarbon-based solvent). The mixture was dispersed using a sand mill to thereby obtain a base paint. Additionally, right before the application, 20 parts (solids content) of Sumidur N3300 (Note 24) and 0.5 parts of KBM-403 (Note 12) were mixed while stirring, thus obtaining top paint composition No. 1 having a solids content of 60%.

Production Examples 13 to 15

Production Examples of Top Paint Compositions Nos. 2 to 4

Top paint compositions Nos. 2 to 4 were obtained as in Production Example 12, except that the component ratios shown in Table 3 were used.

TABLE 3

| | Production Example No. | | | |
|---|---|---|---|---|
| | 12 | 13 | 14 | 15 |
| Top paint composition No. | 1 | 2 | 3 | 4 |
| Acrylic resin obtained by Production Example 16 | 80 | 80 | 70 | 60 |
| Polyester-modified acrylic resin obtained by Production Example 17 | | | | 20 |
| Tipaque CR-93 (Note 7) | 12 | 12 | 12 | 12 |
| Hostaperm Yellow H-3G (Note 17) | 12 | 12 | 12 | 12 |
| Barifine BF 20 (average particle size: 0.03 μm) (Note 18) | 15 | | 15 | 40 |
| SPARWITE W-5HB (average particle size: 1.6 μm) (Note 19) | | 15 | | |
| BARIACE B-30 (average particle size: 0.3 μm) (Note 20) | | | 15 | |
| Bayferrox 4905 (Note 21) | 12 | 12 | 12 | 12 |
| TINUVIN 292 (Note 22) | 1 | 1 | 1 | 1 |
| Actcol T-1000 (Note 23) | | | | 5 |
| Sumidur N3300 (Note 24) | 20 | 20 | 30 | 20 |
| KBM-403 (Note 12) | 0.5 | 0.5 | 0.5 | 1 |

Comparative Production Examples 8 to 11

Production Examples of Top Paint Compositions Nos. 5 to 8

Top paint compositions Nos. 5 to 8 were obtained as in Production Example 12, except that the component ratios shown in Table 4 were used,

TABLE 4

| | Comparative Production Example No. | | | |
|---|---|---|---|---|
| | 8 | 9 | 10 | 11 |
| Top paint composition No. | 5 | 6 | 7 | 8 |
| Acrylic resin obtained by Production Example 15 | 80 | 60 | 80 | 80 |

TABLE 4-continued

| | Comparative Production Example No. | | | |
|---|---|---|---|---|
| | 8 | 9 | 10 | 11 |
| Polyester-modified acrylic resin obtained by Production Example 16 | | 20 | | |
| Tipague CR-93 (Note 7) | 12 | 12 | 12 | 12 |
| Hostaperm Yellow H-3G (Note 17) | 12 | 12 | 12 | 12 |
| Barifine BF-20 (average particle size: 0.03 μm) (Note 18) | 30 | | | |
| SPARWITE W-5HB (average particle size: 1.6 μm) (Note 19) | | 30 | | |
| LAKABAR SF (average particle size: 10.4 μm) (Note 8) | | | 30 | |
| Bayferrox 4905 (Note 21) | 12 | 12 | 12 | 12 |
| TINUVIN 292 (Note 22) | 1 | 1 | 1 | 1 |
| Actcol T-1000 (Note 23) | | | | 5 |
| Sumidur N3300 (Note 24) | 20 | 20 | 20 | 20 |
| KBM-403 (Note 12) | | | 0.5 | 1 |

(Note 17) Hostaperm Yellow H-3G: produced by Clariant, trade name, Hansa yellow-based yellow pigment
(Note 18) Barifine BF-20: produced by Sakai Chemical industry Co., Ltd., tradename, barium sulfate having an average particle size of 0.03 μm
(Note 19) SPARWITE W-5 HB: produced by Sino-Can, trade name, barium sulfate having an average particle size of 1.6 μm
(Note 20) BARIACE B-30: produced by Sakai Chemical Industry Co., Ltd., trade name, barium sulfate having an average particle size of 0.3 μm
(Note 21) Bayferrox 4905: Lanxess, Inc., trade name, red pigment
(Note 22) TINUVIN 292: BASF A.G., trade name, light stabilizer
(Note 23) Actcol T-1000: produced by Mitsui Chemicals, Inc., trade name, polyether polyol, number average molecular weight of 1,000
(Note 24) Sumidur N3300: Sumika Bayer Urethane Co., Ltd., trade name, an isocyanurate body of hexamethylene diisocyanate Production of Multilayer-Coating-Film-Containing Coating Sheet Example 1

Production of Multilayer-Coating-Film-Containing Coating Sheet No. 1
Multilayer-coating-film-containing coating sheet No, 1 was obtained by steps 1 to 3 shown below.
Step 1:
Using primer paint composition No. 1 obtained in Production Example 1, Super Epo Thinner 50 (produced by Kansai Paint Co., Ltd., epoxy resin paint thinner) was added in an amount of 50 parts per 100 parts of primer paint composition No. 1. The mixture was vertically applied by spraying to a cold-rolled steel sheet (size: 0.8×70×150 mm, Palbond #3020) to a film thickness of 40 μm (when dried). Setting was then performed at 23° C. for 3 minutes.
Step 2:
Subsequently, using top paint composition No, 1 obtained in Production Example 11, Kanpe urethane thinner 205 (produced by Kansai Paint Co., Ltd., trade name, two-component urethane paint thinner) was added in an amount of 10 parts per 100 parts of top paint composition No. 1. The mixture was vertically applied by spraying through a wet-on-wet process to the primer coating film to a film thickness of 40 (when dried), thus forming a top coating film.
Step 3:
The coating films obtained by steps 1 and 2 were subjected to setting at 23° C. for 10 minutes, then heated and dried at 80° C. for 30 minutes, and further dried at room temperature (20° C.) for 72 hours, thus obtaining multilayer-coating-film-containing coating sheet No. 1.

Examples 2 to 14

Production of Multilayer-Coating-Film-Containing Coating Sheets Nos. 2 to 14
Multilayer-coating-film-containing coating sheets Nos. 2 to 14 were obtained as in Example 1, except that the paints shown in Table 5 were used as the primer paint composition of step 1 and the top paint composition of step 2.

Comparative Examples 1 to 11

Production of Multilayer-Coating-Film-Containing Coating Sheets Nos. 15 to 25
Multilayer-coating-film-containing coating sheets Nos. 15 to 25 were obtained as in Example 1, except that the paints shown in Table 6 were used as the primer paint composition of step 1 and the top paint composition of step 2.
Coating Film Performance Test
Each multilayer-coating-film-containing coating sheet was subjected to a coating film performance test according to the following test conditions. The results are shown in Tables 5 and 6.
The viscosity of the primer coating film obtained during top paint application, which is shown in these tables, is the viscosity of the uncured coating film of the primer paint composition (A) during the application of the top paint composition (B). The uncured primer coating film after step 1 in the production of multilayer-coating-film-containing coating sheet No. 1 was scraped off using a spatula. The viscosity of the coating film was measured using a rheometer (HAAKE, RS150) at 23° C. and a shear rate of 0.1 s$^{-1}$ (Pa·s).
In the tables, the value ΔNV of the primer is obtained by subtracting the value (NV1) of the application mass solids content (%) of the primer paint composition (A) from the value (NV2) of the mass solids content (%) of the uncured coating film of the primer paint composition (A) during the application of the top paint composition (B).
NV1 and NV2 were measured in the following manner, and the value NV was obtained by ΔNV=NV2-NV1.
NV1 is the value of the mass solids content (%) during the application of the primer paint composition (A). About 0.5 g of the primer paint composition (A) used for application was collected in an aluminum cup having a diameter of 52 mm, and the collected weight (a) was measured. Thereafter, drying was performed at 80° C. for 30 minutes, and the weight (b) of the collected paint after drying was measured. By calculating (b/a)×100, the value NV1(%) was obtained.
NV2 is the value of the mass solids content (%) of the uncured coating film of the primer paint composition (A) during the application of the top paint composition (B).
About 0.5 g of the uncured primer coating film after step 1 of forming the multilayer-coating-film-containing coating sheet was scraped off by a spatula and collected in an aluminum cup having a diameter of 52 mm; then, the collected weight (c) was measured. Thereafter, drying was performed at 80° C. for 30 minutes, and the weight (d) of the collected primer coating film after drying was measured. By calculating (d/c)×100, the value NV2(%) was measured, about 10 mm at a constant speed while firmly pressing it against the surface of the test coating sheet, without breaking

TABLE 5

| | | | Example No. | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| | Multilayer-coating-film-containing coating sheet No. | | 1 | 2 | 3 | 4 | 5 | 6 | 7 | 8 | 9 | 10 | 11 | 12 | 13 | 14 |
| Multilayer coating film | Primer paint composition No. | | 1 | 1 | 1 | 1 | 2 | 3 | 4 | 5 | 6 | 7 | 8 | 9 | 10 | 11 |
| | Top paint composition No. | | 1 | 2 | 3 | 4 | 1 | 1 | 1 | 1 | 1 | 1 | 1 | 1 | 1 | 1 |
| | Viscosity of primer coating film during top film application | | 180 | 180 | 180 | 180 | 350 | 200 | 250 | 120 | 150 | 150 | 170 | 350 | 200 | 800 |
| | ΔNV of primer | | 45 | 45 | 45 | 45 | 30 | 35 | 35 | 25 | 32 | 32 | 30 | 35 | 30 | 30 |
| Coating film performance | Appearance | (Note 25) | A | A | A | A | S | A | S | A | A | A | A | A | A | A |
| | Pencil hardness | (Note 26) | HB | HB | HB | HB | H | H | HB | HB | HB | HB | HB | HB | HB | F |
| | Corrosion resistance | (Note 27) | A | A | A | A | A | S | A | A | A | S | A | A | S | A |
| | Weatherability | (Note 28) | S | A | A | S | S | S | S | S | S | S | S | S | S | S |
| | Chipping resistance | (Note 29) | A | A | A | S | A | A | A | A | A | S | A | S | S | S |

TABLE 6

| | | | Comparative Example No. | | | | | | | | | | |
|---|---|---|---|---|---|---|---|---|---|---|---|---|---|
| | | | 1 | 2 | 3 | 4 | 5 | 7 | 7 | 8 | 9 | 10 | 11 |
| | Multilayer-coating-film-containing coating sheet No. | | 15 | 16 | 17 | 18 | 19 | 20 | 21 | 22 | 23 | 24 | 25 |
| Multilayer coating film | Primer paint composition No. | | 1 | 1 | 1 | 1 | 12 | 13 | 14 | 15 | 16 | 17 | 18 |
| | Top paint composition No. | | 5 | 6 | 7 | 8 | 1 | 1 | 1 | 1 | 1 | 1 | 1 |
| | Viscosity of primer coating film during top film application | | 180 | 180 | 180 | 180 | 50 | 80 | 800 | 3 | 15 | 2000 | 3 |
| | ΔNV of primer | | 40 | 40 | 40 | 40 | 25 | 30 | 45 | 20 | 13 | 48 | 25 |
| Coating film performance | Appearance | (Note 25) | A | B | C | A | B | C | C | C | C | C | C |
| | Pencil hardness | (Note 26) | B | 2H | HB | B | B | 2B | H | F | 2B | HB | F |
| | Corrosion resistance | (Note 27) | A | A | A | A | C | C | A | B | C | C | C |
| | Weatherability | (Note 28) | S | B | B | S | B | A | A | A | C | B | A |
| | Chipping resistance | (Note 29) | A | B | B | B | C | B | B | B | B | C | A |

Performance Evaluation
(Note 25) Appearance:

The appearance of the coating surface of each multilayer-coating-film-containing coating sheet obtained in the Examples and Comparative Examples was visually observed.

S: Excellent smoothness was obtained without the formation of the mixed layer of the top coating film and the primer coating film, and the 60° gloss value was 90 or more.

A: Excellent smoothness was obtained without the formation of the mixed layer of the top coating film and the primer coating film, and the 60° gloss value was 75 or more and less than 90.

B: The layers of the top coating film and the primer coating film were mixed, at least one slight reduction in appearance selected from the group consisting of swelling, dulling, and flaking was observed, and the 60° gloss value was 60 or more and less than 75.

C: The layers of the top coating film and the primer coating film were significantly mixed, at least one significant reduction in appearance selected from the group consisting of swelling, dulling, and flaking was observed, and the 60° gloss value was less than 60.
(Note 26) Pencil hardness:

Following the procedure specified by JIS K5600-5-4, the lead of a pencil was placed against the surface of each multilayer-coating-film-containing coating sheet (test coating sheet) obtained in the Examples and Comparative Examples at an angle of about 45°, and moved forward about 10 mm at a constant speed while firmly pressing it against the surface of the test coating sheet, without breaking the lead. The hardness number of the pencil with the greatest hardness that did not tear the coating film was recorded as the pencil hardness (2H, H, F, HB, B, 2B, in order of hardness).
(Note 27) Corrosion resistance:

Cross-cuts were made with a knife on each multilayer-coating-film-containing coating sheet obtained in the Examples and Comparative Examples. The coating sheet was subjected to a salt-spray resistance test for 120 hours in accordance with JIS Z-2371, Corrosion resistance was evaluated according to the following criteria, based on the width of rusting and blistering from the knife cut.

S: The maximum width of rusting and blistering from the cut was less than 2 mm (single side)

A: The maximum width of rusting and blistering from the cut was not less than 2 mm and less than 3 mm (single side).

B: The maximum width of rusting and blistering from the cut was not less than 3 mm and less than 4 mm (single side).

C: The maximum width of rusting and blistering from the cut was not less than 4 mm (single side).
(Note 28) Weatherability:

Each multilayer-coating-film-containing coating sheet obtained in the Examples and Comparative Examples was subjected to the sunshine carbon arc lamp type light resistance and weathering test according to JIS B-7533. The test was conducted until the irradiation time became 1200 hours at maximum. The irradiation time when the coating film of the test sheet has a gloss retention rate of 80% relative to the gloss value before the test was measured.

S: The gloss retention rate was 80% or more even when the irradiation time was 1200 hours.

A: The irradiation time in which the gloss retention rate was less than 80% was 1000 hours or more and less than 1200 hours.

B: The irradiation time in which the gloss retention rate was less than 80% was 800 hours or more and less than 1000 hours.

C: The irradiation time in which the gloss retention rate was less than 80% was less than 800 hours.

(Note 29) Chipping resistance:

Each multilayer-coating-film-containing coating sheet obtained in the Examples and Comparative Examples was placed on a sample holder of a chipping test device (produced by Suga Test Instruments Co., Ltd., flying stone chipping tester, JA-400), and fixed in a manner such that the coating surface was positioned at 90° C. with respect to the outlet of the stones. 500 g of crushed granite of No. 6 particle size was blown 5 times onto the test plate with compressed air at 0.294 MPa (3 kgf/cm$^2$) at 20° C. A cloth adhesive tape (produced by Fuji Industrial Co., Ltd.) was applied to the coating surface; afterward, the tape was rapidly peeled off to evaluate the occurrence of scratches etc. formed on the coating film according to the following criteria.

S: The scratches had a diameter of 1.0 mm or less.

A: The scratches had a diameter exceeding 1.0 mm and 1.5 mm or less.

B: The scratches had a diameter exceeding 1.5 mm and 2.0 mm or less.

C: The scratches had a diameter exceeding 2.0 mm.

INDUSTRIAL APPLICABILITY

A coated article having excellent appearance, corrosion resistance, weatherability, and chipping resistance canoe obtained by coating using a wet-on-wet process.

The invention claimed is:

1. A method for forming a multilayer coating film comprising forming an uncured coating film of a primer paint composition (A) as defined below on a substrate, forming a top coating film of a top paint composition (B) as defined below on the uncured coating film, and simultaneously drying the films, wherein the uncured coating film of the primer paint composition (A) during application of the top paint composition (B) has a viscosity of 5 Pa·s to 1000 Pa·s, and a value ΔNV obtained by subtracting a value (NV1) of application mass solids content (%) of the primer paint composition (A) from a value (NV2) of mass solids content (%) of the uncured coating film of the primer paint composition (A) during application of the top paint composition (B) is 15 or more;

primer paint composition (A):

a paint composition comprising an epoxy resin (a1) having a weight average molecular weight of 20000 or more, a rust preventive pigment (a2), a color pigment (a3), and an extender pigment (a4), the composition containing the rust preventive pigment (a2) in an amount of 1 to 70 parts by mass, the color pigment (a3) in an amount of 40 to 150 parts by mass, and the extender pigment (a4) in an amount of 40 to 150 parts by mass, per 100 parts by mass of the total solids content of the epoxy resin (a1);

top paint composition (B):

a paint composition comprising an acrylic resin (b1), a polyisocyanate compound (b2), a silane coupling agent (b3), and barium sulfate (b4) having an average particle size of 0.01 to 5.0 μm, the composition containing the acrylic resin (b1) and the polyisocyanate compound (b2) in a proportion of 60 to 90 parts by mass to 10 to 40 parts by mass, and the barium sulfate (b4) in an amount of 1 to 50 parts by mass, per 100 parts by mass of the total solids content of the acrylic resin (b1) and the polyisocyanate compound (b2).

2. The method according to claim 1, wherein the primer paint composition (A) further comprises a silane coupling agent (a5) in an amount of 0.1 to 10 parts by mass, per 100 parts by mass of the total solids content of the epoxy resin (a1).

3. The method according to claim 2, wherein the primer paint composition (A) comprises talc as at least part of the extender pigment (a4) in an amount of 0.1 to 30 parts by mass, per 100 parts by mass of the total solids content of the epoxy resin (a1).

4. The method according to claim 3, wherein the top paint composition (B) further comprises polyether polyol in an amount of 0.1 to 30 parts by mass, per 100 parts by mass of the total solids content of the acrylic resin (b1) and the polyisocyanate compound (b2).

5. A method for producing construction machinery or industrial machinery having a multilayer coating film, the method comprising the step of forming a multilayer coating film by using the method according to claim 4.

6. A method for producing construction machinery or industrial machinery having a multilayer coating film, the method comprising the step of forming a multilayer coating film by using the method according to claim 3.

7. The method according to claim 2, wherein the top paint composition (B) further comprises polyether polyol in an amount of 0.1 to 30 parts by mass, per 100 parts by mass of the total solids content of the acrylic resin (b1) and the polyisocyanate compound (b2).

8. A method for producing construction machinery or industrial machinery having a multilayer coating film, the method comprising the step of forming a multilayer coating film by using the method according to claim 7.

9. A method for producing construction machinery or industrial machinery having a multilayer coating film, the method comprising the step of forming a multilayer coating film by using the method according to claim 2.

10. The method according to claim 1, wherein the primer paint composition (A) comprises talc as at least part of the extender pigment (a4) in an amount of 0.1 to 30 parts by mass, per 100 parts by mass of the total solids content of the epoxy resin (a1).

11. The method according to claim 10, wherein the top paint composition (B) further comprises polyether polyol in an amount of 0.1 to 30 parts by mass, per 100 parts by mass of the total solids content of the acrylic resin (b1) and the polyisocyanate compound (b2).

12. A method for producing construction machinery or industrial machinery having a multilayer coating film, the method comprising the step of forming a multilayer coating film by using the method according to claim 11.

13. A method for producing construction machinery or industrial machinery having a multilayer coating film, the method comprising the step of forming a multilayer coating film by using the method according to claim 10.

14. The method according to claim 1, wherein the top paint composition (B) further comprises polyether polyol in an amount of 0.1 to 30 parts by mass, per 100 parts by mass of the total solids content of the acrylic resin (b1) and the polyisocyanate compound (b2).

15. A method for producing construction machinery or industrial machinery having a multilayer coating film, the method comprising the step of forming a multilayer coating film by using the method according to claim 14.

16. A method for producing construction machinery or industrial machinery having a multilayer coating film, the method comprising the step of forming a multilayer coating film by using the method according to claim 1.

* * * * *